United States Patent [19]
Tsukagoshi

[11] Patent Number: 5,422,949
[45] Date of Patent: Jun. 6, 1995

[54] SUBSCRIBER TERMINAL APPARATUS
[75] Inventor: Hirofumi Tsukagoshi, Kawasaki, Japan
[73] Assignee: Fujitsu Limited, Kawasaki, Japan
[21] Appl. No.: 195,217
[22] Filed: Feb. 14, 1994
[30] Foreign Application Priority Data
  Sep. 17, 1993 [JP] Japan .................. 5-231123
[51] Int. Cl.6 ............................................ H04Q 11/04
[52] U.S. Cl. ............................... 379/399; 379/102; 379/90; 370/110.1; 370/60; 370/85.13
[58] Field of Search ..................... 379/399, 102, 90; 370/56, 60, 110.1, 85.13, 66, 58.1

[56] References Cited
U.S. PATENT DOCUMENTS

| | | | |
|---|---|---|---|
| 4,377,859 | 3/1983 | Dunning et al. | 370/58 |
| 4,680,754 | 7/1987 | Fechalos | 370/85 |
| 4,737,950 | 4/1988 | Fechalos | 370/56 |
| 5,146,455 | 9/1992 | Goke et al. | 370/66 |
| 5,214,638 | 5/1993 | Norz et al. | 370/58.1 |

Primary Examiner—James L. Dwyer
Assistant Examiner—Jacques M. Saint-Surin

[57] ABSTRACT

A subscriber terminal apparatus for connecting plurality of subscriber lines from subscriber units with a remote switching station via communication lines, the apparatus including: a selective switching unit, provided with a first number of subscriber terminals connected to the respective subscriber lines and a second, smaller number of station terminals connected to the communication lines, for selectively switching connections between the station terminals and the subscriber terminals; a communication unit, associated with the communication lines, for transmitting a signal from the apparatus to the switching station and for receiving a control signal supplied from the switching station; and a control unit, associated with the communication unit and the selective switching unit, for selecting one of the subscriber terminals of the selective switching unit and one of the station terminals thereof in accordance with the control signal from the communication unit, and for controlling the switching operation of the selective switching unit so that the selected subscriber terminal and the selected station terminal are connected to each other within the selective switching unit, wherein the subscriber lines are connected with the switching station through the selective switching unit based on subscriber management data of the switching station.

5 Claims, 6 Drawing Sheets

SUBSCRIBER TERMINAL APPARATUS

BACKGROUND OF THE INVENTION (1) Field of the Invention

The present invention relates to a subscriber terminal apparatus for connecting a plurality of subscriber lines with a remote switching station via a communication line.

(2) Description of the Prior Art

A subscriber terminal apparatus is provided to accommodate a plurality of subscriber units (for example, telephone units) at locations remote from a switching station and to connect a plurality of subscriber lines from the subscriber units to the switching station via communication lines. Some of the subscriber lines in the subscriber terminal apparatus are not connected to any subscriber units and are provided for new subscribers which will be added to the subscriber terminal apparatus in the future. These subscriber lines are hereinafter called the vacant subscriber lines.

The subscriber terminal apparatus includes a concentrator connected to the communication line, and a distribution frame (DF) connected to the subscriber lines. All the subscriber lines in the service range are connected to subscriber terminals of the distribution frame. Within the distribution frame, the vacant subscriber lines are not connected to the concentrator, and only the accommodated subscriber lines are connected to the concentrator. When a new subscriber is added to the subscriber terminal apparatus, the subscriber line of the new subscriber unit and a line from the concentrator are connected within the distribution frame (DF). By connecting the corresponding subscriber terminal of the DF to the concentrator, it is possible for the subscriber line from the new subscriber unit to be connected to the switching station through the subscriber terminal apparatus. It is desirable to provide an apparatus which ensures an easy and efficient maintenance of subscriber units accommodated in the apparatus.

FIG. 6 shows a known subscriber terminal apparatus for connecting a plurality of telephone lines to a switching station which is remote from the telephone units. In FIG. 6, a switching station 51 and a plurality of telephone units 53 are connected by a subscriber terminal apparatus 55. The subscriber terminal apparatus 55 has a concentrator 57 (or a multiplexer) and a distribution frame 56 (or a cross-box).

The switching station 51 and the concentrator 57 are interconnected by a communication line 52. Lines of the concentrator 57 linked to the communication line 52 are connected to concentrator terminals of the distribution frame (DF) 56. On the other hand, the respective subscriber lines 54 from the telephone units 53 are connected to subscriber terminals of the distribution frame (DF) 56. Some of the subscriber lines 54 are not connected to telephone units and are provided for new subscribers which will be added to the subscriber terminal apparatus 55.

The number of the subscriber terminals of the distribution frame (DF) 56 to which the subscriber lines 54 are connected is greater than the number of the concentrator terminals of the distribution frame (DF) 56 to which the concentrator 57 is connected. In FIG. 6, F1 indicates the number of the concentrator terminals of the distribution frame (DF) 56, and F2 indicates the number of the subscriber terminals of the distribution frame (DF) 56. Usually, the number F2 of the distribution frame is two or three times as great as the number F1.

When a new telephone unit is added to the subscriber terminal apparatus, the corresponding subscriber terminal of the DF 56 and a concentrator terminal of the DF 56 are manually connected using a jumper line or the like, as indicated by a dotted line in FIG. 6. By performing the above mentioned connection relating to the DF 56, the newly added telephone unit is accommodated in the subscriber terminal apparatus, and the telephone unit can communicate with another telephone unit through the switching station.

If the number of telephone units 53 accommodated in the subscriber terminal apparatus has increased and exceeds the number of concentrator terminals of the DF 56, it is impossible to connect the subscriber lines of the additional telephone units to the concentrator 57 via the DF 56. In such a case, it is necessary to install an additional subscriber terminal apparatus, although the distribution frame 56 still has the vacant subscriber lines 54.

In the conventional apparatus described above, it is necessary that the subscriber terminal of the DF 56 and the concentrator terminal of the DF 56 be manually connected using a jumper line when the addition of a new subscriber unit is needed. It is necessary that the existing connection mentioned above be modified when the change of a certain subscriber unit is needed. In order to carry out the maintenance of subscriber units in the conventional apparatus, a manual connection change operation, relating to the distribution frame of the apparatus, must be performed by a maintenance person. In many cases, the subscriber terminal apparatus 55 is arranged at a location remote from the switching station, and no maintenance person is available at the remote location. Thus, it is necessary that a maintenance person who is stationed at the switching station goes to the location of the apparatus to perform the connection change operation of the distribution frame. In addition, the connection change operation mentioned above must be carefully performed by the maintenance person without making a mistake.

It is desirable that the maintenance of subscriber units in the subscriber terminal apparatus be directly or automatically carried out under the control of the switching station. However, in the case of the conventional apparatus described above, it is difficult to efficiently carry out the maintenance of subscriber units under the control of the switching station. The method of management of the maintenance of subscriber units by the switching station is that connection data indicating the connections of the subscriber lines 54 of the subscriber terminal apparatus 55 is printed out and the maintenance operation of the distribution frame 56 is performed by a maintenance person in accordance with the printed-out connection data. The cost of the maintenance operation of the distribution frame is therefore high.

SUMMARY OF THE INVENTION

Accordingly, it is a general object of the present invention to provide an improved subscriber terminal apparatus in which the above described problems are eliminated.

Another, more specific object of the present invention is to provide a subscriber terminal apparatus which carries out the functions of the distribution frame described above under the control of the switching station and provides efficient maintenance of subscriber units within the subscriber terminal apparatus.

These and other objects of the present invention are achieved by a subscriber terminal apparatus for connecting a plurality of subscriber lines from subscriber units to a remote switching station via communication lines, the apparatus including: a selective switching unit, provided with a first number of subscriber terminals connected to the respective subscriber lines and a second, smaller number of station terminals connected to the communication lines, for selectively switching connections between the station terminals and the subscriber terminals; a communication unit, associated with the communication lines, for transmitting a signal from the apparatus to the switching station and for receiving a control signal supplied from the switching station; and a control unit, associated with the communication unit and the selective switching unit, for selecting one of the subscriber terminals of the selective switching unit and one of the station terminals thereof in accordance with the control signal from the communication unit, and for controlling the switching operation of the selective switching unit so that the selected subscriber terminal and the selected station terminal are connected to each other within the selective switching unit, wherein the subscriber lines are connected to the switching station through the selective switching unit based on subscriber management data of the switching station.

According to the present invention, it is possible for the maintenance of subscriber unit connections within the subscriber terminal apparatus to be accomplished by controlling the switching operation of the selective switching unit based on the subscriber management data stored in the switching station. The functions of the distribution frame in the conventional apparatus can be carried out by the subscriber terminal apparatus of the present invention. It is possible to remarkably reduce the cost of the maintenance of the subscriber units within the subscriber terminal apparatus.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

Figure 1:
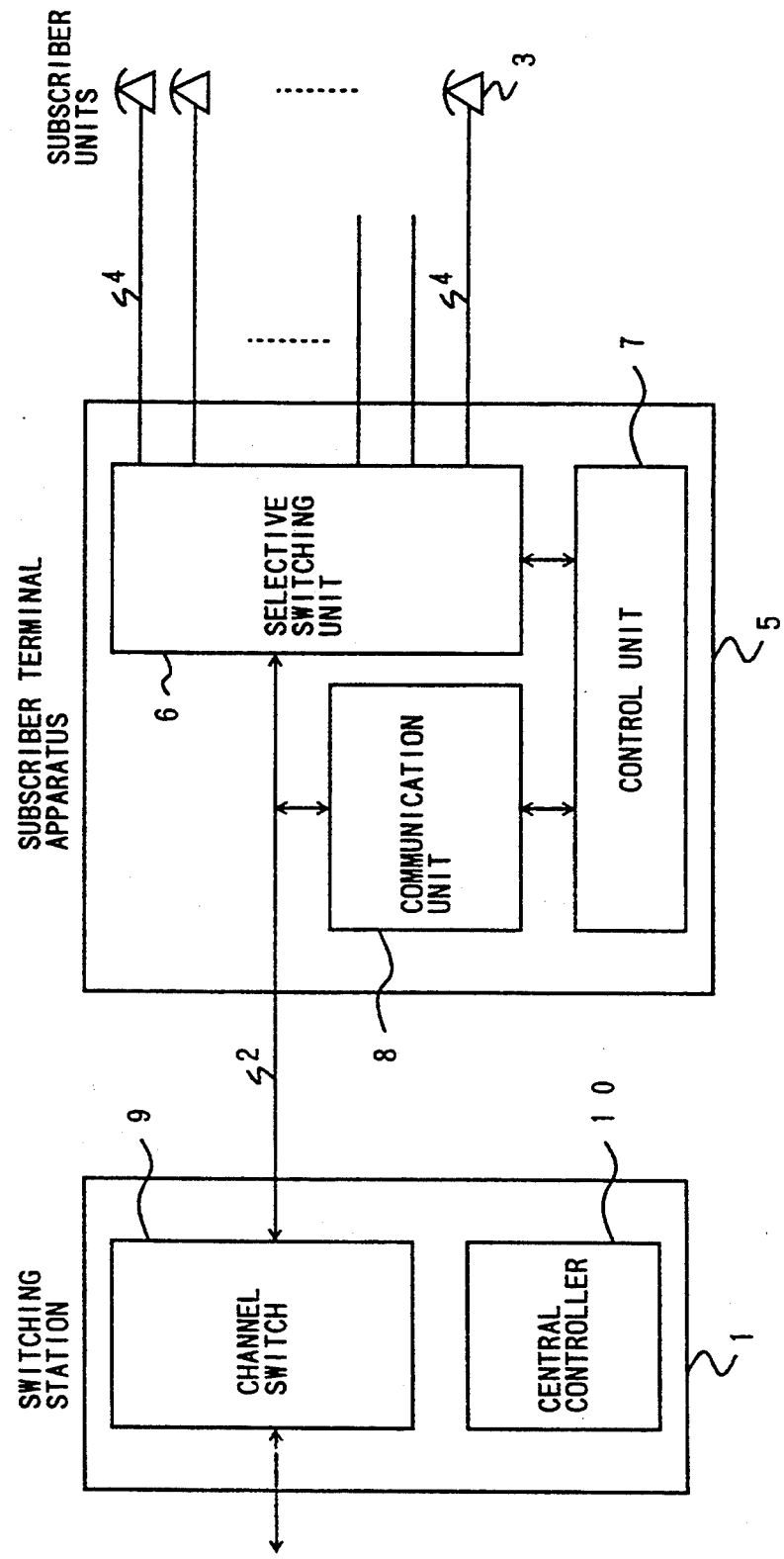
FIG. 1 is a block diagram showing a subscriber terminal apparatus according to the present invention.

A description will now be given with reference to FIG. 1, of a subscriber terminal apparatus according to the present invention. In FIG. 1, a subscriber terminal apparatus 5 connects a plurality of subscriber lines 4 from subscriber units 3 to a switching station 1 via a communication line 2. The switching station 1 is provided with a channel switch 9 and a central controller 10.

The subscriber terminal apparatus 5 in FIG. 1 comprises a selective switching unit 6, a control unit 7 and a communication unit 8. The selective switching unit 6 is provided with a first number of subscriber terminals connected to the respective subscriber lines 4 and a second, smaller number of station terminals connected to the communication line 2. The selective switching unit 6 selectively switches the respective connections of the station terminals with the subscriber terminals. The communication unit 8 is associated with the communication line 2 from the switching station 1, and transmits a signal from the apparatus 5 to the switching station 1 and receives a control signal supplied from the switching station 1. The control unit 7 is associated with the communication unit 8 and the selective switching unit 6, and selects one of the subscriber terminals of the selective switching unit 6 and one of the station terminals thereof in accordance with the control signal from the communication unit 8. The control unit 7 controls the switching operation of the selective switching unit 6 so that the selected subscriber terminal and the selected station terminal are connected to each other within the selective switching unit 6. In the subscriber terminal apparatus described above, the subscriber lines 4 are connected to the switching station 1 through the selective switching unit 6 based on subscriber management data of the switching station 1.

The selective switching unit 6 selectively switches the connections between the station terminals and the subscriber terminals under the control of the control unit 7. The central controller 10 of the switching station 1 carries out the management of the subscriber units within the apparatus 5. The subscriber management data stored in the switching station 1 is updated when the addition of a new subscriber to the apparatus 5 is needed or when the change of a certain subscriber is needed. A control signal is generated by the central controller 10 based on the updated subscriber management data, and the control signal is transmitted to the apparatus 5 via the communication line 2. The control signal from the switching station 1 is received by the communication unit 8, and it is transferred from the communication unit 8 to the control unit 7. The control unit 7 selects a designated subscriber terminal of the selective switching unit 6 (which terminal is vacant and is now to be connected to the new subscriber line 4) and a designated station terminal of the selective switching unit 6 in accordance with the control signal from the switching station 1. The control unit 7 controls the switching operation of the selective switching unit 6 so that the selected subscriber terminal and the selected station terminal are connected to each other within the selective switching unit 6.

In the subscriber terminal apparatus of the present invention, the maintenance of subscriber units within the subscriber terminal apparatus can be accomplished by directly controlling the switching operation of the selective switching unit based on the subscriber management data stored in the switching station. It is possible to easily and efficiently carry out the maintenance of the subscriber units in response to the addition of a new subscriber or the change of a certain subscriber.

Next, a description will be given, with reference to FIG. 2, of a first embodiment of the present invention.

Figure 2:
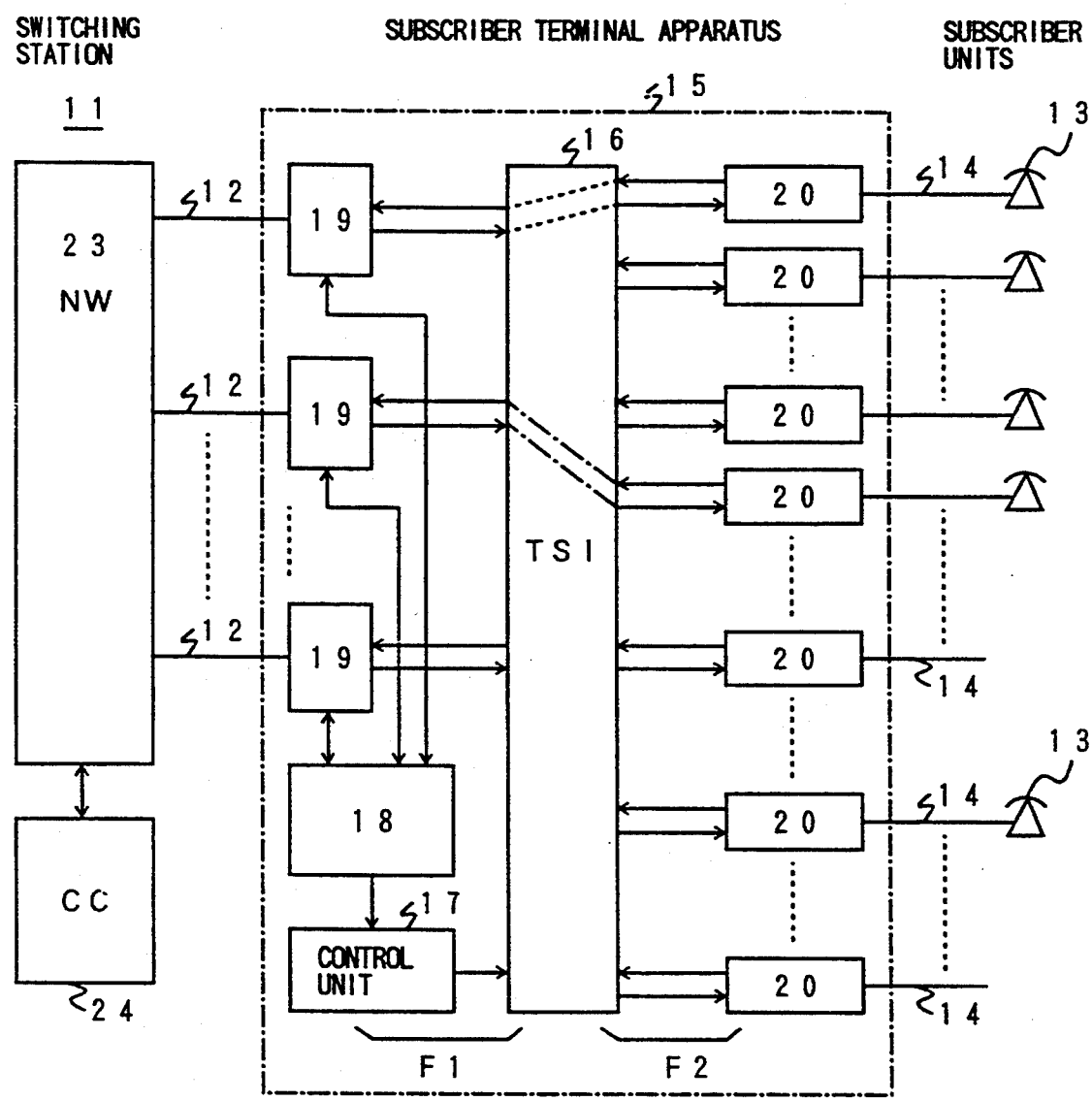
FIG. 2 is a block diagram showing a first embodiment of the subscriber terminal apparatus of the present invention.

FIG. 2 shows a subscriber terminal apparatus of the first embodiment of the present invention. In FIG. 2, a subscriber terminal apparatus 15 connects a plurality of subscriber lines 14 to a switching station 11 through communication lines 12. The switching station 11 is remote from the subscriber terminal apparatus. The switching station 11 is provided with a channel switch (NW) 23 and a central controller (CC) 24 connected to the channel switch 23. The central controller 24 controls the operation of the channel switch 23.

The communication lines 12 from the switching station 11 are connected to a time-slot interchange (TSI) unit 16 of the subscriber terminal apparatus 15 through line interface units 19. The subscriber lines 14 are connected to the TSI unit 16 through subscriber interface units 20. Some of the subscriber lines 14 are not connected to subscriber units and are provided for new subscribers which will be added to the subscriber terminal apparatus 15 in the future. The other subscriber lines 14 are connected to subscriber units 13.

The subscriber terminal apparatus 15 in FIG. 2 is provided with a data link unit 18 and a control unit 17. The line interface units 19 are connected to the data link unit 18, and the data link unit 18 is connected to the control unit 17. The control unit 18 is connected to the TSI unit 16, and it controls the operation of the TSI unit 16 in accordance with a control signal supplied from the switching station 11. The time-slot interchange unit 16 corresponds to the selective switching unit 6 in FIG. 1. The data link unit 18 corresponds to the communication unit 8 in FIG. 1.

In FIG. 2, F1 indicates the number of station terminals of the TSI unit 16 to which the line interface units 19 are connected. F2 indicates the number of subscriber terminals of the TSI unit 16 to which the subscriber interface units 20 are connected. Some of the subscriber lines 14 are not connected to subscriber units and provided for new subscribers which will be added to the subscriber terminal apparatus 15 in the future. The number F2 of the subscriber terminals of the TSI unit 16 is two or three times as great as the number F1 of the station terminals of the TSI unit 16.

The time-slot interchange unit 16 is provided with a multiplexer for assigning a time slot number to a designated one of the station terminals, and the TSI unit 16 is provided with a multiplexer for assigning a time slot number to a designated one of the subscriber terminals. When the time slot number assigned to the station terminal is the same as the time slot number assigned to the subscriber terminal, the station terminal and the subscriber terminal are connected within the TSI unit 16 in that time slot. The control unit 17 controls the operation of the TSI unit 16 in accordance with the control signal supplied from the switching unit 11, and a time slot number of a designated station terminal is assigned to a designated subscriber terminal, so that the designated station terminal and the designated subscriber terminal are connected within the TSI unit 16 in the time slot, as indicated by a dotted line or a dotted chain line in FIG. 2.

The control and functions of the time-slot interchange unit 16 described above are accomplished by making use of, for example, a digital cross-connect technique.

When the subscriber lines 14 are analog lines, the subscriber interface units 20 are provided with an analog-to-digital converter and a digital-to-analog converter, so that digital signals travel between the time-slot interchange unit 16 and the subscriber interface units 20. In addition, digital signals travel between the time-slot interchange unit 16 and the line interface units 19.

With the subscriber terminal apparatus in FIG. 2, the maintenance of the subscriber units 13 accommodated in the subscriber terminal apparatus 15 is automatically accomplished by the switching station 11 in accordance with an operating system (OS) of the central controller 24.

If it is necessary to add a new subscriber to the subscriber terminal apparatus 15, subscriber management data stored in the switching station 11 is updated in response to the addition of the new subscriber. A control signal is generated in the switching station 11 based on the updated subscriber management data, and the control signal is supplied from the switching station 11 to the subscriber terminal apparatus 15 via the communication line 12. In the subscriber terminal apparatus 15, the line interface unit 19 separates the control signal from the information received from the switching station 11, and the control signal from the line interface unit 19 is transferred to the control unit 17 through the data link unit 18. The control unit 17 controls the operation of the time-slot interchange unit 16 in accordance with the control signal supplied from the switching station 11. A time slot number of a designated station terminal is assigned to a designated subscriber terminal under the control of the control unit 17. The designated subscriber terminal of the TSI unit 16 corresponds to a subscriber line 14 for the new subscriber unit 13 to be added. The designated station terminal and the designated subscriber terminal are then connected within the TSI unit 16. This makes it possible to accommodate the new subscriber unit 13 in the subscriber terminal apparatus 15, and the new subscriber unit 13 can be connected to the switching station 11 through the apparatus 15.

If it is necessary to change a previous subscriber line 14 of a certain subscriber unit 13 to a new subscriber line 14 within the subscriber terminal apparatus 15, the subscriber management data stored in the switching station 11 is updated in response to the change of the subscriber unit 13. A control signal corresponding to the change is generated in the switching station 11 based on the updated subscriber management data, and the control signal is supplied from the switching station 11 to the subscriber terminal apparatus 15 via the communication line 12. The control unit 17 of the subscriber terminal apparatus 15 controls the operation of the time-slot interchange unit 16 in accordance with the control signal supplied from the switching station 11. The time slot number previously assigned to the previous subscriber terminal (connected to the previous subscriber line 14 to be changed) is assigned to a new subscriber terminal (connected to the new subscriber line 14) under the control of the control unit 17. The designated station terminal and the new subscriber terminal are connected to each other within the TSI unit 16. After this change is made, a call to the present subscriber unit 13 at the switching station 11 is transferred to the new subscriber line 14 through the subscriber terminal apparatus 15, and there is no need to change a subscriber identification number.

If it is necessary to transfer a certain subscriber unit 13 to a different subscriber terminal apparatus, or it is necessary to remove a certain subscriber unit 13 from the present subscriber terminal apparatus 15 to cease the use of the subscriber line, the subscriber management data stored in the switching station 11 is updated in response to the change of the subscriber unit. A control signal corresponding to the change is generated in the switching station 11 based on the updated subscriber management data, and the control signal is supplied from the switching station 11 to the subscriber terminal apparatus 15 via the communication line 12. Similarly to the above cases, the control unit 17 of the subscriber terminal apparatus 15 controls the operation of the time-slot interchange unit 16 in accordance with the control signal supplied from the switching station 11. At this time, the time slot number assigned to the subscriber terminal corresponding to the present subscriber unit 13 is deleted, and the station terminal corresponding to the time slot number is thus disconnected from the subscriber terminal.

Accordingly, the maintenance of the subscriber units 13 within the subscriber terminal apparatus 15 can be carried out under the control of the switching station 11. The functions of the distribution frame in the conventional apparatus are carried out by the subscriber terminal apparatus of this embodiment. It is possible to remarkably reduce the cost of the maintenance of subscriber units accommodated within the subscriber terminal apparatus.

In the subscriber terminal apparatus 15 in FIG. 2, an interface unit including a multiplexer for performing a signal multiplexing and demultiplexing may be provided between the switching station 11 and the apparatus 15, so that the switching station 11 and the subscriber terminal apparatus 15 are interconnected via multiplex lines on which multiplexed signals are delivered.

Figure 3:
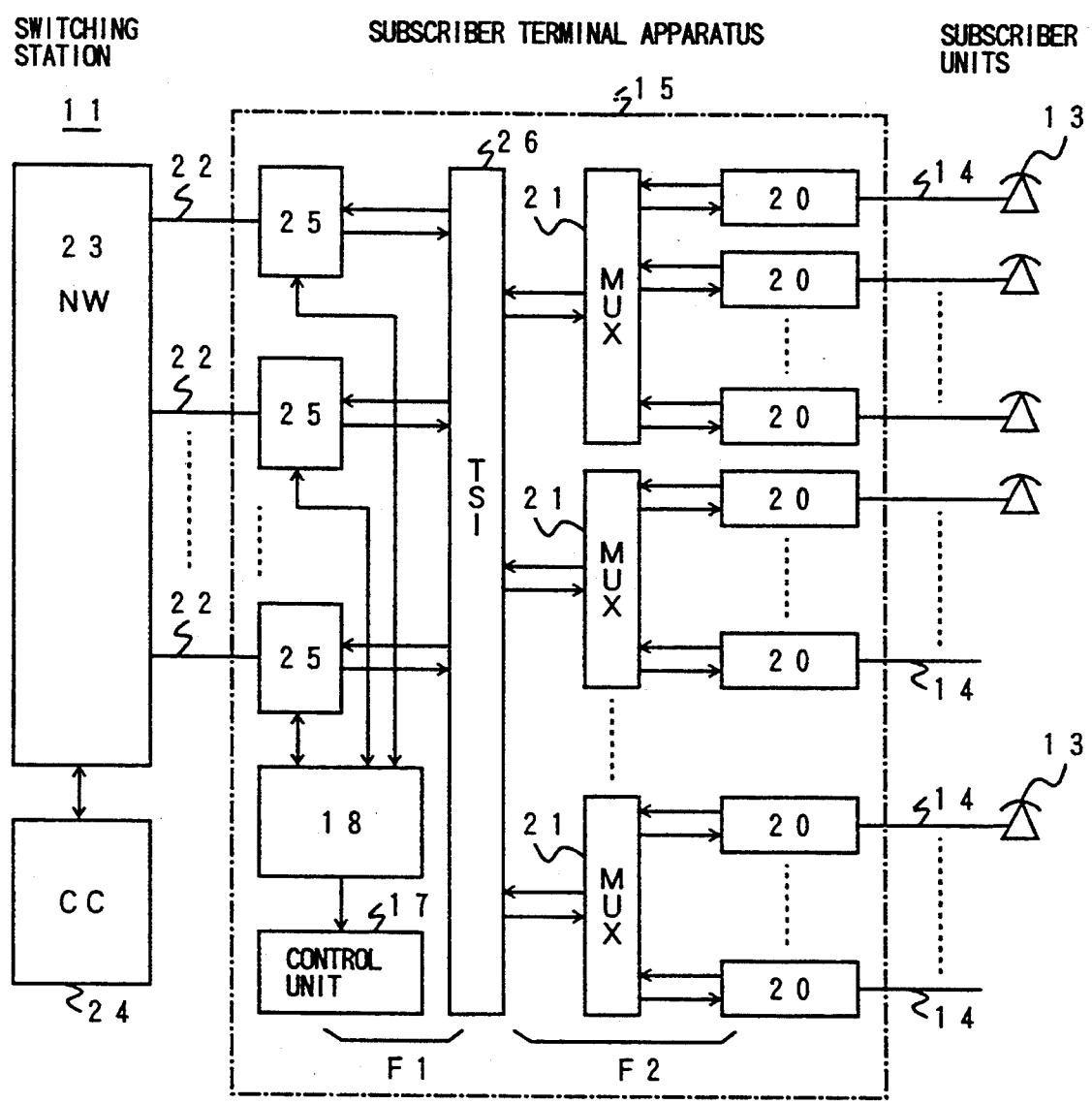
FIG. 3 is a block diagram showing a second embodiment of the subscriber terminal apparatus of the present invention.

Next, a description will be given, with reference to FIG. 3, of a second embodiment of the present invention. FIG. 3 shows the subscriber terminal apparatus of the third embodiment. In FIG. 3, the units which are the same as corresponding units in FIG. 2 are designated by the same reference numerals.

The subscriber terminal apparatus 15 in FIG. 3 connects a plurality of subscriber lines 14 to the switching station 11 through a plurality of multiplex lines 22. The switching station 11 includes the channel switch (NW) 23 and the central controller (cc) 24.

The multiplex lines 22 from the switching station 11 are connected to a time-slot interchange (TSI) unit 26 of the subscriber terminal apparatus 15 through a plurality of line interface units 25. The subscriber lines 14 from the subscriber units 13 are respectively connected to the subscriber interface units 20. Some of the subscriber lines 14 are not connected to subscriber units and are provided for new subscribers which will be added to the subscriber terminal apparatus 15 in the future.

In the subscriber terminal apparatus in FIG. 3, the subscriber interface units 20 are connected to the TSI unit 26 through a plurality of multiplexers (MUX) 21. Each multiplexer (MUX) 21 is connected to a number of subscriber interface units 20. The time-division multiplexing function of the respective multiplexer 21 is utilized, and the number of the subscriber lines 14 connected to all the multiplexers 21 is made to be greater than the number of the subscriber terminals of the TSI unit 26.

In the subscriber terminal apparatus in FIG. 3, the format of multiplexed signals present at the station terminals of the TSI unit 26 is made to accord with the format of multiplexed signals present at the subscriber terminals thereof. By making use of the functions of this time-slot interchange unit 26, the maintenance of subscriber units (e.g., the addition of a new subscriber unit) is carried out by assigning a time slot to a designated subscriber line so as to make the time slot array at the subscriber terminals of the TSI unit 26 accord with the time slot array at the station terminals of the TSI unit 26.

Figure 4:
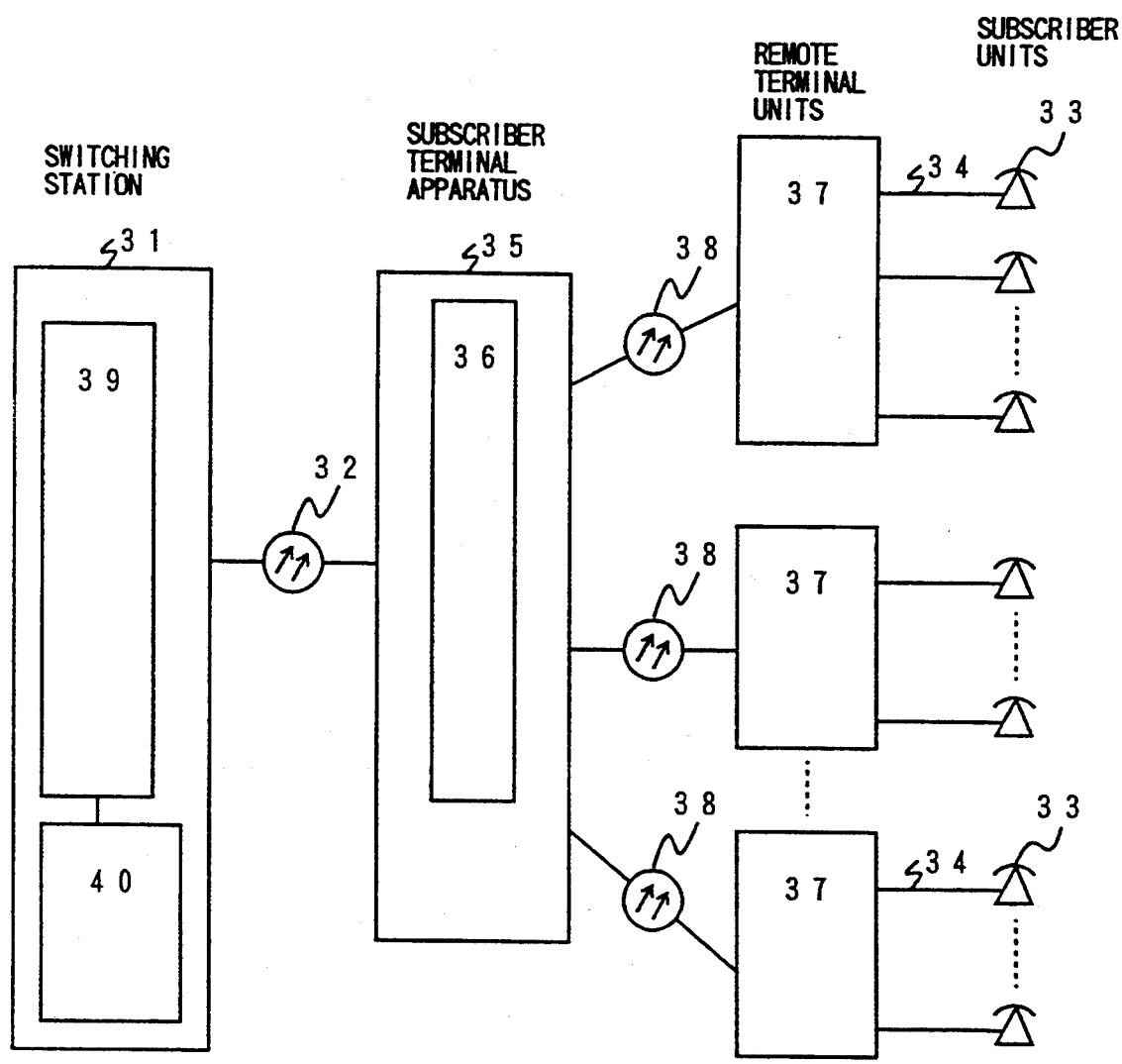
FIG. 4 is a block diagram showing a third embodiment of the subscriber terminal apparatus of the present invention.

Next, a description will be given, with reference to FIG. 4, of a third embodiment of the present invention. In FIG. 4, a subscriber terminal apparatus 35 of the third embodiment connects a plurality of subscriber lines 34 to a switching station 31 through an optical fiber cable 32. The switching station 31 includes a channel switch 39 and a central controller 40.

The subscriber terminal apparatus 35 in FIG. 4 includes a selective switching unit 36 which corresponds to the TSI unit 26 of the second embodiment. The selective switching unit 36 is connected to a number of remote terminal units 37 via a number of optical fiber cables 38, and each remote terminal unit 37 is connected to a number of subscriber lines 34 so that a number of subscriber units 33 connected to these subscriber lines 34 are accommodated in the remote terminal unit 37.

The remote terminal units 37 are called Optical Network Units (ONU), and each of them provides an interface function to deliver signals from the optical fiber cable 38 to one of the subscriber lines 34, and vice versa. The respective remote terminal unit 37 includes a multiplexer and a photo-electric conversion part: the multiplexer performs signal multiplexing and demultiplexing for a number of subscriber lines 34; and the photo-electric conversion part converts multiplexed electrical signals into optical signals and converts optical signals into multiplex electrical signals. On the respective optical fiber cable 38 between the remote terminal unit 37 and the subscriber terminal apparatus 35, multiplex optical signals are delivered from one to the other, and vice versa.

The remote terminal units 37 in FIG. 4 correspond to the multiplexers (MUX) 21, shown in FIG. 3, each of which is connected to a number of subscriber interface units 20. More specifically, in the subscriber terminal apparatus 35 of the third embodiment of FIG. 4, the multiplexers (MUX) 21 each connected to a number of subscriber interface units 20 in the second embodiment of FIG. 3 are replaced by the remote terminal units 37, and the multiplex lines between the TSI unit 26 and the multiplexers (MUX) 21 in the second embodiment are replaced by the optical fiber cables 38.

The functions of the respective remote terminal units 37 are utilized, and thus the number of subscriber lines 34 connected to all the remote terminal units 37 is made to be greater than the number of subscriber terminals of the selective switching unit 36.

In FIG. 4, on the optical fiber cable 32 between the subscriber terminal apparatus 35 and the switching station 31, multiplex optical signals are delivered. The subscriber management data stored in the switching station 31 is updated in response to any change of the subscriber units 33 within the apparatus 35. A control signal is generated by the central controller 40 based on the updated subscriber management data, the control signal is converted into a multiplex optical signal, and this signal is supplied from the switching station 31 to the subscriber terminal apparatus 35 via the optical fiber cable 32. Similarly to the first and second embodiments described above, in the subscriber terminal apparatus 35, the operation of the selective switching unit 36 is controlled in accordance with the control signal supplied from the switching station 31, so that a selected station terminal and a selected subscriber terminal are connected within the selective switching unit 36.

Accordingly, the functions of the distribution frame in the conventional apparatus can be carried out by the subscriber terminal apparatus 35, and the management of subscriber units accommodated within the apparatus can be accomplished under the control of the switching station.

Figure 5:
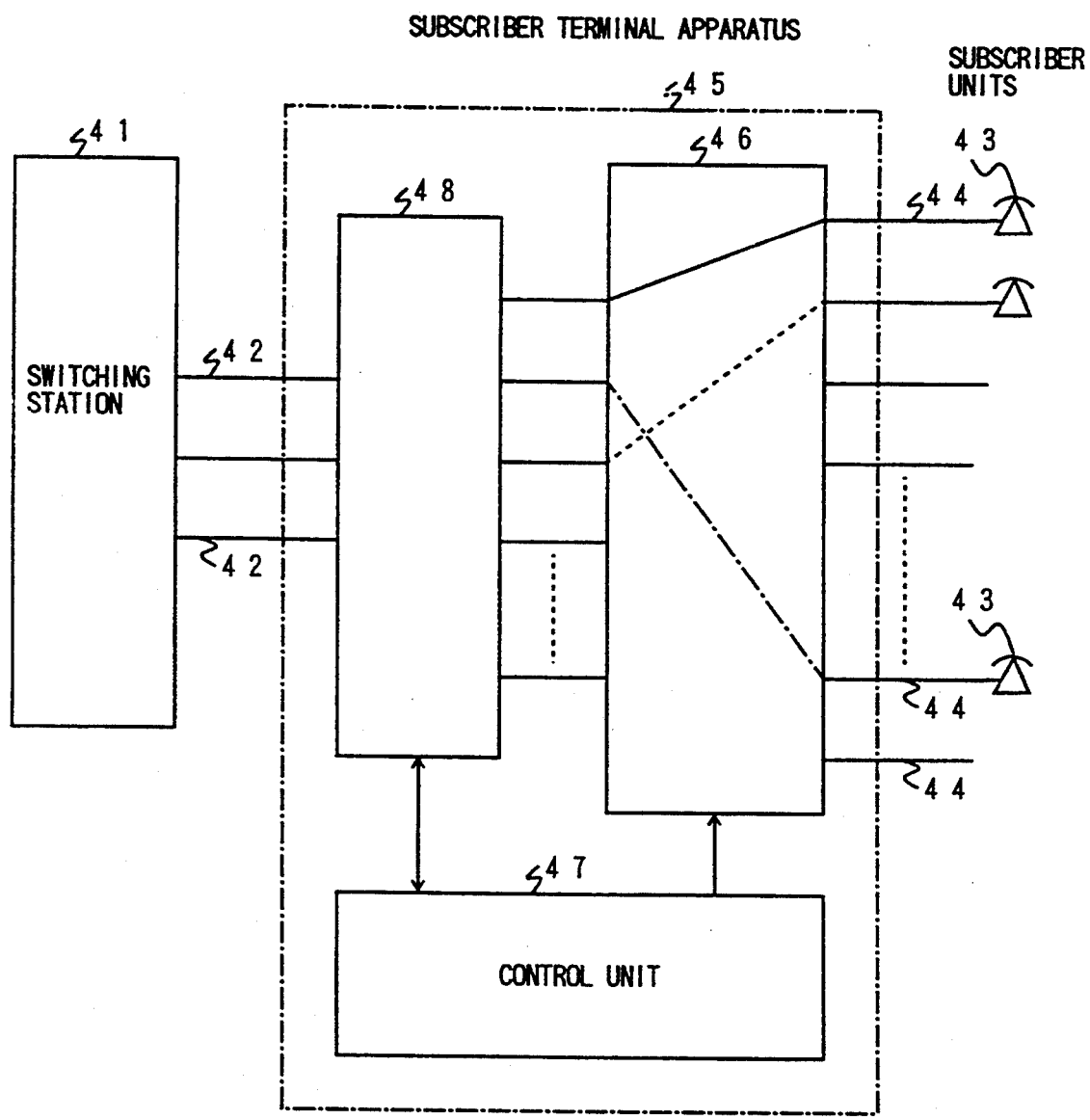
FIG. 5 is a block diagram showing a fourth embodiment of the subscriber terminal apparatus of the present invention.
Figure 6:
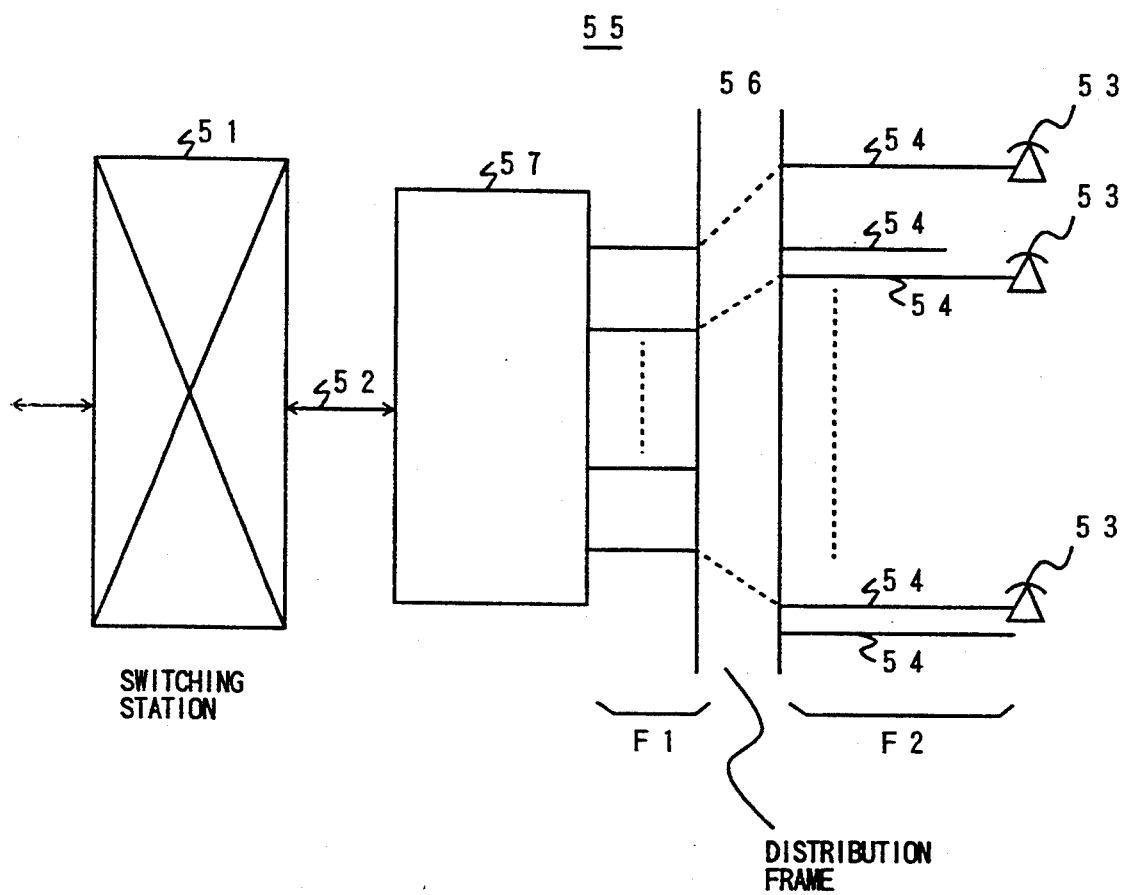
FIG. 6 is a block diagram showing a conventional subscriber terminal apparatus.

Next, a description will be given, with reference to FIG. 5, of a fourth embodiment of the present invention. In FIG. 5, a subscriber terminal apparatus 45 of this embodiment connects a plurality of subscriber lines 44 from subscriber units 43 to a switching station 41 via a number of communication lines 42.

The subscriber terminal apparatus 45 in FIG. 5 includes a selective switching unit 46, a control unit 47, and a concentrator (or a multiplexer) 48. The selective switching unit 46 of this embodiment corresponds to the selective switching unit 6 shown in FIG. 1. The selective switching unit 46 is either a space-division channel switch or a time-division channel switch. The space-division channel switch and the time-division channel switch are commonly used in the existing time-division switches. The space-division channel switch, which is also called a space switch, is comprised of a selector and does not rearrange the time sequence of connections in response to a data stream. The time-division channel switch, which is also called a time switch, is comprised by using a channel memory and has a function of rearranging the time sequence of connections in response to a data stream by storing the data in the channel memory.

The selective switching unit 46 selectively switches the connections of the station terminals (which are associated with the concentrator 48) and the subscriber terminals (which are associated with the subscriber lines 44) under the control of the control unit 47, as indicated by a solid line, a dotted line and a dotted chain line in FIG. 5.

The selective switching unit 46 of this embodiment is different from the time-slot interchange unit 16 or 26 in that switching the connections between the terminals of the unit 46 is not controlled in accordance with the time slot timing as in the unit 16 or 26. The control of the switching of the terminal connections of the selective switching unit 46 is similar to that of the known space-division channel switch or the known time-division channel switch, and it is relatively simple in comparison with the control of the switching of the terminal connections of the time-slot interchange unit 16 or 26.

The concentrator (or the multiplexer) 48 of the subscriber terminal apparatus 45 is connected to the switching station 41 through a plurality of communication lines 42. The connections of the concentrator 48 and the switching station 41 are made in accordance with the number of the communication lines 42 and in accordance with the degree of multiplexing of the communication lines 42.

Similarly to the previously described embodiments, a control signal is generated by the switching station 41 based on the updated subscriber management data, and this signal is supplied from the switching station 41 to the subscriber terminal apparatus 45 via one of the communication lines 42. In the subscriber terminal apparatus 45, the operation of the selective switching unit 46 is controlled by the control unit 47 in accordance with the control signal supplied from the switching station 41, so that a selected station terminal and a selected subscriber terminal are connected within the selective switching unit 46.

Accordingly, the functions of the distribution frame in the conventional apparatus can be carried out by the subscriber terminal apparatus 45, and the maintenance of the subscriber unit connections within the apparatus can be accomplished under the control of the switching station 41.

Further, the present invention is not limited to the above described embodiments, and variations and modifications may be made without departing from the scope of the present invention.

What is claimed is:

1. A subscriber terminal apparatus for connecting a plurality of subscriber lines from subscriber units and a plurality of communication lines from a remote switching station, said apparatus comprising:

selective switching means including a first number of subscriber terminals connected to the respective subscriber lines and a second, smaller number of station terminals connected to the communication lines, for selectively switching connections between the subscriber terminals and the station terminals;

communication means, associated with the communication lines, for transmitting an information signal from the subscriber units to the switching station and receiving from the switching station a data signal and a control signal, said control signal being indicative of subscriber management data; and control means, coupled with said communication means and said selective switching means, for selecting one of the subscriber terminals and one of the station terminals in accordance with the subscriber management data indicated by the control signal received from the switching station via said communication means, and for controlling the switching operation of said selective switching means so that the selected subscriber terminal and the selected station terminal are connected to each other by internal lines within said selective switching means, wherein the subscriber lines are connected to the switching station through said selective switching means based on the subscriber management data indicated by the control signal received from the switching station and the data signal is transmitted and received by the communication means through a connection between the selected subscriber terminal and the selected station terminal obtained within said selective switching means.

2. An apparatus according to claim 1, wherein said selective switching means is a time-slot interchange unit which selectively switches connections between the station terminals and the subscriber terminals in accordance with time slot numbers, the respective time slot number being designated by a control signal supplied from the switching station.

3. An apparatus according to claim 2, wherein the subscriber terminals of said selective switching means are connected to the subscriber lines through a plurality of multiplexers, said respective multiplexers carrying out a time division multiplexing and demultiplexing of a number of subscriber lines, and the station terminals of said selective switching means are connected to said switching station through the communication lines.

4. An apparatus according to claim 1, wherein said selective switching means is either a space-division channel switch or a time-division channel switch, which selectively switches connections between the station terminals and the subscriber terminals under the control of said control means.

5. An apparatus according to claim 1, wherein said selective switching means is connected to a number of remote terminal units via a number of optical fiber cables, and the respective remote terminal units are connected to a number of the subscriber lines, and the apparatus is connected to the switching station via an optical fiber cable.

* * * * *